(12) United States Patent
Forsythe et al.

(10) Patent No.: US 10,943,127 B2
(45) Date of Patent: Mar. 9, 2021

(54) MEDIA PROCESSING

(71) Applicant: StageClip Limited, Southam (GB)

(72) Inventors: Rupert Forsythe, Southam (GB); James Pain, Colchester (GB); Mark Andrew, Haslemere (GB)

(73) Assignee: StageClip Limited, Southam (GB)

( * ) Notice: Subject to any disclaimer, the term of this patent is extended or adjusted under 35 U.S.C. 154(b) by 161 days.

(21) Appl. No.: 16/425,638

(22) Filed: May 29, 2019

(65) Prior Publication Data

US 2019/0370558 A1   Dec. 5, 2019

(30) Foreign Application Priority Data

Jun. 1, 2018   (GB) .................................. 1809015

(51) Int. Cl.
| | |
|---|---|
| *G06K 9/46* | (2006.01) |
| *G06K 9/00* | (2006.01) |
| *H04N 21/8547* | (2011.01) |

(52) U.S. Cl.
CPC ..... *G06K 9/00758* (2013.01); *G06K 9/00664* (2013.01); *G06K 9/00751* (2013.01); *G06K 9/00765* (2013.01); *H04N 21/8547* (2013.01)

(58) Field of Classification Search
CPC ........... G06K 9/00758; G06K 9/00751; G06K 9/00664; G06K 9/00765; G06K 9/00744; H04N 21/8547; H04N 21/25866; H04N 21/23418; H04N 21/8549; H04N 21/8456; H04N 21/4126; H04N 21/481; H04N 21/2665; H04N 21/42204; G06F 16/7834; G10L 17/00; G11B 27/34

USPC ........................................................ 382/190
See application file for complete search history.

(56) References Cited

U.S. PATENT DOCUMENTS

| | | | | |
|---|---|---|---|---|
| 6,067,411 | A * | 5/2000 | Poimboeuf ............... | G06F 1/06 375/362 |
| 8,726,400 | B1 * | 5/2014 | Granstrom ......... | H04N 21/2187 726/26 |
| 9,773,525 | B2 * | 9/2017 | Lettau .................... | G11B 27/34 |
| 10,108,254 | B1 * | 10/2018 | Kammerl ............. | G11B 27/034 |
| 10,516,911 | B1 * | 12/2019 | Nielsen ............... | H04N 21/4305 |
| 2004/0001106 | A1 * | 1/2004 | Deutscher ............... | G06F 16/40 715/838 |

(Continued)

OTHER PUBLICATIONS

2014. Graduation Ceremony Handshake Clip. Retrieved from https://onlineshop.shef.ac.uk/product-catalogue/professional-services/graduation-ceremony/graduation-ceremony-handshake-clip.

(Continued)

*Primary Examiner* — Mahendra R Patel
(74) *Attorney, Agent, or Firm* — Banner & Witcoff, Ltd.

(57) ABSTRACT

This disclosure relates to a computer implemented method of media processing, computer program and media processing system. Source media relating to a mass participation event is received, wherein the source media includes a source video of the mass participation event. A plurality of video segments in the source video are identified, wherein each different video segment relates to a different participant in the mass participation event one of the plurality of video segments are matched to a particular participant of the mass participation event. A media clip is then output relating to the particular participant, wherein the media clip comprises the video segment that has been matched to the particular participant.

17 Claims, 7 Drawing Sheets

(56) References Cited

U.S. PATENT DOCUMENTS

| | | | | |
|---|---|---|---|---|
| 2004/0107254 | A1* | 6/2004 | Ludwig | G06Q 10/10 709/204 |
| 2009/0087161 | A1* | 4/2009 | Roberts | H04N 21/8549 386/282 |
| 2011/0271207 | A1* | 11/2011 | Jones | H04W 4/023 715/753 |
| 2011/0312412 | A1* | 12/2011 | Walker | G06Q 20/367 463/25 |
| 2013/0188932 | A1* | 7/2013 | Hartley | G11B 27/10 386/282 |
| 2013/0259447 | A1* | 10/2013 | Sathish | G11B 27/034 386/278 |
| 2014/0123186 | A1* | 5/2014 | Reisman | H04N 21/8543 725/38 |
| 2015/0319308 | A1* | 11/2015 | Katis | H04L 67/24 455/413 |
| 2015/0334313 | A1* | 11/2015 | Chougle | H04L 65/1083 348/14.07 |
| 2016/0007059 | A1* | 1/2016 | Cassanova | H04N 21/4722 725/14 |
| 2016/0180724 | A1* | 6/2016 | Frith, Jr. | G09B 5/06 434/322 |
| 2017/0018290 | A1* | 1/2017 | Hendry | H04N 21/8456 |
| 2018/0181730 | A1* | 6/2018 | Lyske | G06F 21/6209 |

OTHER PUBLICATIONS

Photography & Video. WSU Commencement Ceremonies. Retrieved from https://commencement.wsu.edu/photography-video/. Visited May 2019.

2019. Pic2Go. Digital Race Experience-Sharing. Retrieved from http://www1.pic2go.com/.

* cited by examiner

FROM FIG. 4A

| | Comment | Default | | | | | | | | | | | | | | | ✓ | Edit | | Actor |
|---|---|---|---|---|---|---|---|---|---|---|---|---|---|---|---|---|---|---|---|---|
| 0 | | 1:13:26.00 | 1:13:49.80 | 0:00:23.80 | | | | 0 | 0 | 0 | B | I | U | $ | fn | AB | AB | AB | AB | ✓ | ● Time ○ Frame □ Show Original |

Reem Selim #Postgraduate Certificate in Structural Engineering

| # | Start | End | Text |
|---|---|---|---|
| 1 | 1:13:26.00 | 1:13:49.80 | Reem Selim #Postgraduate Certificate in Structural Engineering |
| 2 | 1:13:49.30 | 1:14:06.10 | Peter Tschumperlin #Postgraduate Diploma in Bridge Engineering |
| 3 | 1:14:05.60 | 1:14:34.20 | Raudah Nurun Nisaa Mohammed # Master of Science in Advanced Geotechnical Engineering |
| 4 | 1:14:33.70 | 1:14:55.40 | Antoine Samuel Pierre-Louis #Master of Science in Advanced Geotechnical Engineering |
| 5 | 1:14:54.90 | 1:15:21.10 | Antoino Garcia Povil #Master of Science in Bridge Engineering |

MEDIA PROCESSING

CROSS REFERENCE TO RELATED APPLICATION

This application claims priority to UK patent application number 1809015.9, titled "Media Processing" and filed on Jun. 1, 2018, the entirety of which is incorporated herein.

TECHNICAL FIELD

The present disclosure relates to a method, computer program and system for media processing.

BACKGROUND

Today, professional videographers attend and film major mass participation events which they live stream, put on a USB stick/DVD or upload to video sharing sites such as YouTube. In order to edit a long video of a mass participation event into individual, personalised clips for each participant, currently, a time consuming human process is carried out. For example, a videographer performs a post-production role that involves raw camera footage being broken down through human intervention, identifying and selecting individual shots, creating features from the best camera angles and then manually re-organizing into a coherent sequence to produce the final product.

Our market research shows that personalised clips can be pre-ordered by participants at mass participation events and these are created manually taking days and often weeks of lead time given the man hours and skills currently required to produce them. To create these digital personalised clips involves the editor physically reviewing the film footage, identifying the participant by name and by ear, if the name is on a sound recording, or by eye, if the person is identified visually, and then manually matching the person to the video to extract the relevant parts of the film with that participant in shot. Some examples of such personalised clips can be found at https://commencement.wsu.edu/photography-video/ and https://onlineshop.shef.ac.uk/product-catalogue/professional-services/graduation-ceremony/graduation-ceremony-handshake-clip.

In sport related mass participation events, automated editing has been tried, where video clips from a longer video may be created through the use of barcodes. See, for example, http://www1.pic2go.com/. The end-product is a digital, personalized clip, but it relies on each participant wearing a visible barcode or number to be detected by the automated system, which is not always desirable or feasible (for example, at a graduation ceremony, a student may not like to wear a number or barcode during their graduation).

There is therefore a desire to achieve a scalable and fast, ideally real-time, clip creator for videos of mass participation events, without requiring any changes to the format of the event or appearance of the participants.

SUMMARY

In a first aspect of the present disclosure, there is provided a computer implemented method of media processing comprising: receiving source media relating to a mass participation event, wherein the source media comprises a source video of the mass participation event; identifying a plurality of video segments in the source video, wherein each different video segment relates to a different participant in the mass participation event; matching one of the plurality of video segments to a particular participant of the mass participation event; and outputting a media clip relating to the particular participant, wherein the media clip comprises the video segment that has been matched to the particular participant.

The source media may further comprise an audio track, wherein matching one of the plurality of video segments to a particular participant of the mass participation event is based at least in part on the audio track.

Matching one of the plurality of video segments to a particular participant of the mass participation event may comprise: performing audio recognition on at least part of the audio track to recognise an audible identifier; comparing the audible identifier against a first list of participant identifiers; and if the audible identifier matches an identifier in the first list of participant identifiers, determining a video segment in the plurality of video segments that corresponds to a position of the audible identifier in the audio track, wherein the matched identifier in the first list of participant identifiers corresponds to the particular participant and the identified video segment is the video segment that matches to the particular participant.

The method may further comprise: segmenting the audio track into a plurality of audio segments, wherein audio recognition is performed on a first audio segment of the plurality of audio segments.

Identifying a video segment in the plurality of video segments that corresponds to the position of the audible identifier in the audio track may be based at least in part on: an audio timecode indicative of the start and/or end of the first audio segment; and a video timecode indicative of a start and/or end of the identified video segment.

The first list of participant identifiers may comprise identifiers for all of the plurality of participants.

Alternatively, the first list of participant identifiers may be an initial list of participant identifiers comprising identifiers for some, but not all, of the plurality of participants. If the audible identifier does not match an identifier in the initial list of participant identifiers, the method may further comprise: comparing the audible identifier against a second list of participant identifiers; and if the audible identifier matches an identifier in the second list of participant identifiers, determining a video segment in the plurality of video segments that corresponds to a position of the audible identifier in the audio track, wherein the matched identifier in the second list of participant identifiers corresponds to the particular participant and the identified video segment is the video segment that matches to the particular participant.

The second list of participant identifiers may comprise identifiers for all of the plurality of participants.

Alternatively, the second list of participant identifiers may be an extended list of participant identifiers comprising identifiers for some, but not all, of the participants, and wherein at least some of the identifiers in the extended list of participant identifiers do not appear in the initial list of participant identifiers. If the audible identifier does not match an identifier in the extended list of participant identifiers, the method may further comprise: comparing the audible identifier against a third list of participant identifiers; and if the audible identifier matches an identifier in the third list of participant identifiers, determining a video segment in the plurality of video segments that corresponds to a position of the audible identifier in the audio track, wherein the matched identifier in the third list of participant identifiers corresponds to the particular participant and the identified video segment is the video segment that matches to the particular participant.

The third list of participant identifiers may comprise identifiers for all of the plurality of participants.

The audible identifier may be an audible name; and the participant identifiers may be participant names.

The source video may comprise a plurality of image frames, wherein analysing the source video to identify a plurality of video segments may comprise: analysing the plurality of image frames to identify a plurality of scenes in the source video; and categorising each scene as a particular scene types.

The method may be further configured to: detect a recurring pattern in the scene types across the plurality of scenes, wherein each instance of the recurring pattern comprises one or more scenes, and wherein the image frames in each instance of the recurring pattern make up a respective video segment of the plurality of video segments.

The method may further comprise: discarding at least one scene that does not fit the recurring pattern such that the discarded at least one scene does not appear in any of the plurality of segments.

Each of the plurality of image frames may comprises a plurality of pixels, wherein analysing the plurality of image frames to identify the plurality of scenes in the source video is based at least in part on colour values of the plurality of pixels in the plurality of image frames.

Each segment of the plurality of segments may comprise one or more of the scenes.

The media clip may further comprise at least one of: a front template video sequence preceding the video segment that has been matched to the particular participant; and/or a back template video sequence following the video segment that has been matched to the particular participant; and/or a graphics overlay on the video segment that has been matched to the particular participant; and/or a portion of an audio track corresponding to the video segment that has been matched to the particular participant; and/or an audio overlay.

The source media may be a live media feed of the mass participation event, or recorded media of the mass participation event.

In a second aspect of the present disclosure, there is provided a computer program configured to perform the method of the first aspect when executed on at least one processor of an electronic device.

In a third aspect of the present disclosure, there is provided a media processing system configured to: receive source media relating to a mass participation event, wherein the source media comprises a source video of the mass participation event; identify a plurality of video segments in the source video, wherein each different video segment relates to a different participant in the mass participation event; match one of the plurality of video segments to a particular participant of the mass participation event; and output a media clip relating to the particular participant, wherein the media clip comprises the video segment that has been matched to the particular participant.

DRAWINGS

Aspects of the present disclosure are described, by way of example only, with reference to the following drawings, in which.

DETAILED DESCRIPTION

The present disclosure relates to a method, system and computer program for improved efficiency and speed of video editing, processing and distribution for media clips of mass participation events using image and audio processing technology. The present disclosure creates a capability that enables high volumes of media clips, each featuring specific individuals taking part in a mass participation event, to be automatically produced in a very short period of time, or in real-time. The technology has the capability to produce media clips from multiple events, simultaneously and concurrently from multiple locations around the globe. The media clips may then be distributed through an integrated platform, direct to the individuals involved.

Complex media editing has previously not been very quick or scalable. Producing personalised digital media clips, for single individuals on a mass scale, and very quickly or instantaneously, requires a sophisticated solution and the present disclosure has been designed and developed to implement intelligent matching algorithms to analyse raw footage from multiple film shots and develop artificial learning technologies so that the digital media clips automatically correlate with the correct subject (for example, the correct person).

In today's market there are alternative media products available for recordings of mass participation events, ranging from physical products such as static photos to DVDs. There are also digital products such as live streaming of events and video sharing sites (e.g. YouTube). The present disclosure strives to improve on both existing digital products and physical media products by editing and personalising media clips automatically so that high volumes of individual media clips can be produced live, across multiple events taking place at the same time from any location and made available immediately to the individuals involved, for example so they may be shared instantly on social media.

Mass participation events are events where multiple participants, or subjects (such as people, or objects), take part in an event in turn. For example, it may be a school/college/university graduation ceremony where multiple students receive an academic award in turn, or a sports event such as a triathlon where multiple athletes pass a particular filming point during the event or receive awards/recognition of participation in turn after the event, or a corporate event where various employees receive an award or recognition in turn, or a vehicle display (such as an airshow) where each participant is a vehicle that is displayed in turn, etc. Such mass participation events are often filmed in a full-length media film. It is an object of the present disclosure to quickly recognise each participant in the full-length media film, extract the parts of the full-length media film that relate to each recognised participant and generate media clips for each participant, so that each media clip features a particular participant, but does not include the rest of the full-length media film.

Figure 1:
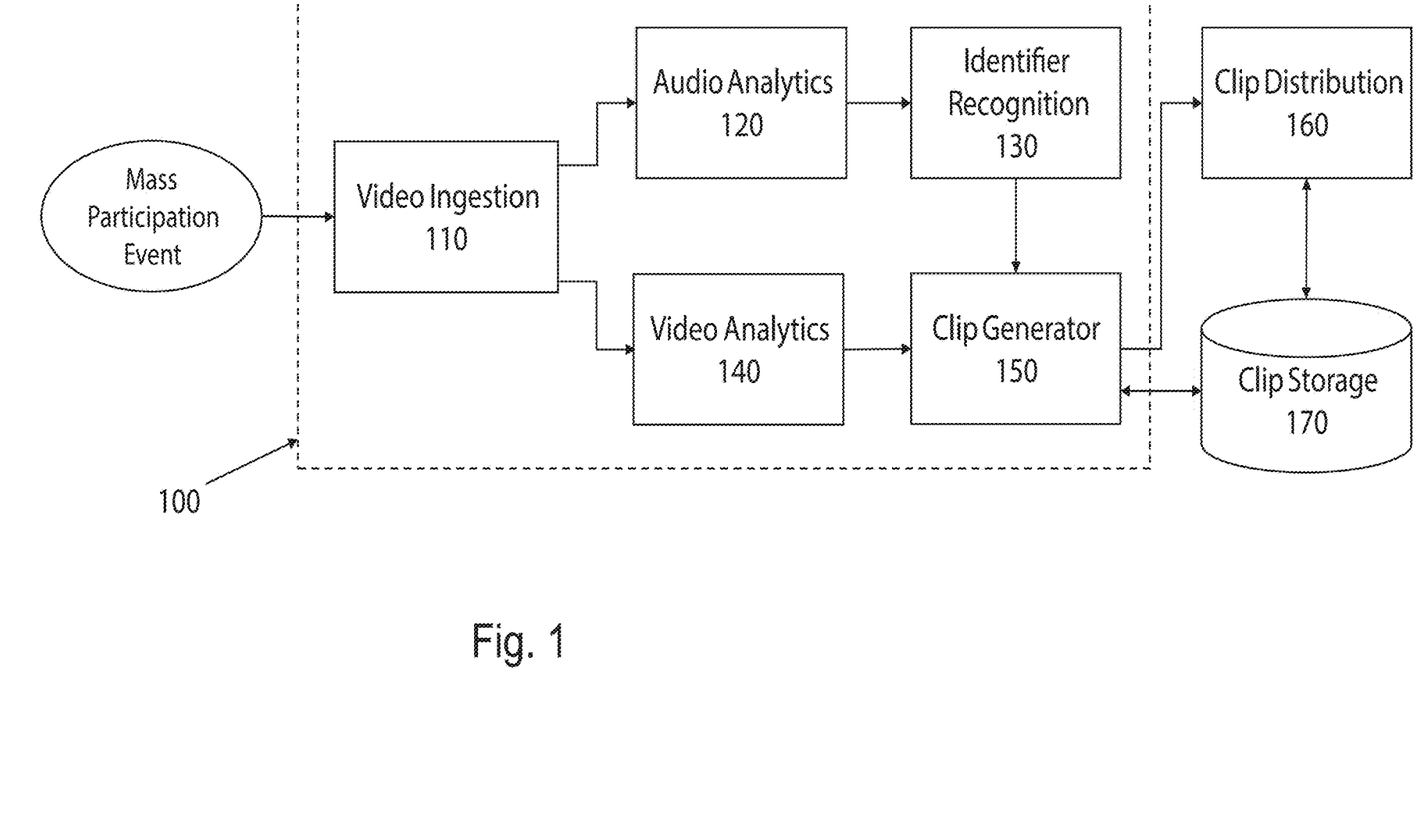
FIG. 1 shows an example schematic representation of a system in accordance with an aspect of the present disclosure.

FIG. 1 shows an example schematic representation of a system 100 in accordance with an aspect of the present disclosure. A video ingestion module 110 receives source media relating to a mass participation event, for example by receiving a live media feed of the source media, or by receiving a recording of the source media (e.g., a recoding that is received through video upload). The video ingestion module 110 may receive a single piece of source media at any one time, or may receive multiple instances of source media at the same time (for example, each source media relating to a different event, potentially taking place in different locations) and process them in parallel to create media clips. The source media comprises a source video (which comprises a plurality of image frames and may contain mixed media from multiple camera angles) and an audio track. The video ingestion module 110 may be configured to perform file format conversion if necessary, depending on the format of the source media and the format required by the audio analytics module 120 and the video analytics module 140. The video ingestion module 110 may be configured to extract the audio track from the source media and pass it to the audio analytics module 120 and extract the source video from the source media and pass it to the video analytics module 140. Alternatively, the video ingestion module 110 may pass the source media to the audio analytics module 120 and the video analytics module 140, where the audio track and source video may be extracted respectively.

The audio analytics module 120 is configured to analyse the audio track of the source media in order to match segments of the source media to particular participants of the mass participation event.

Figure 2:
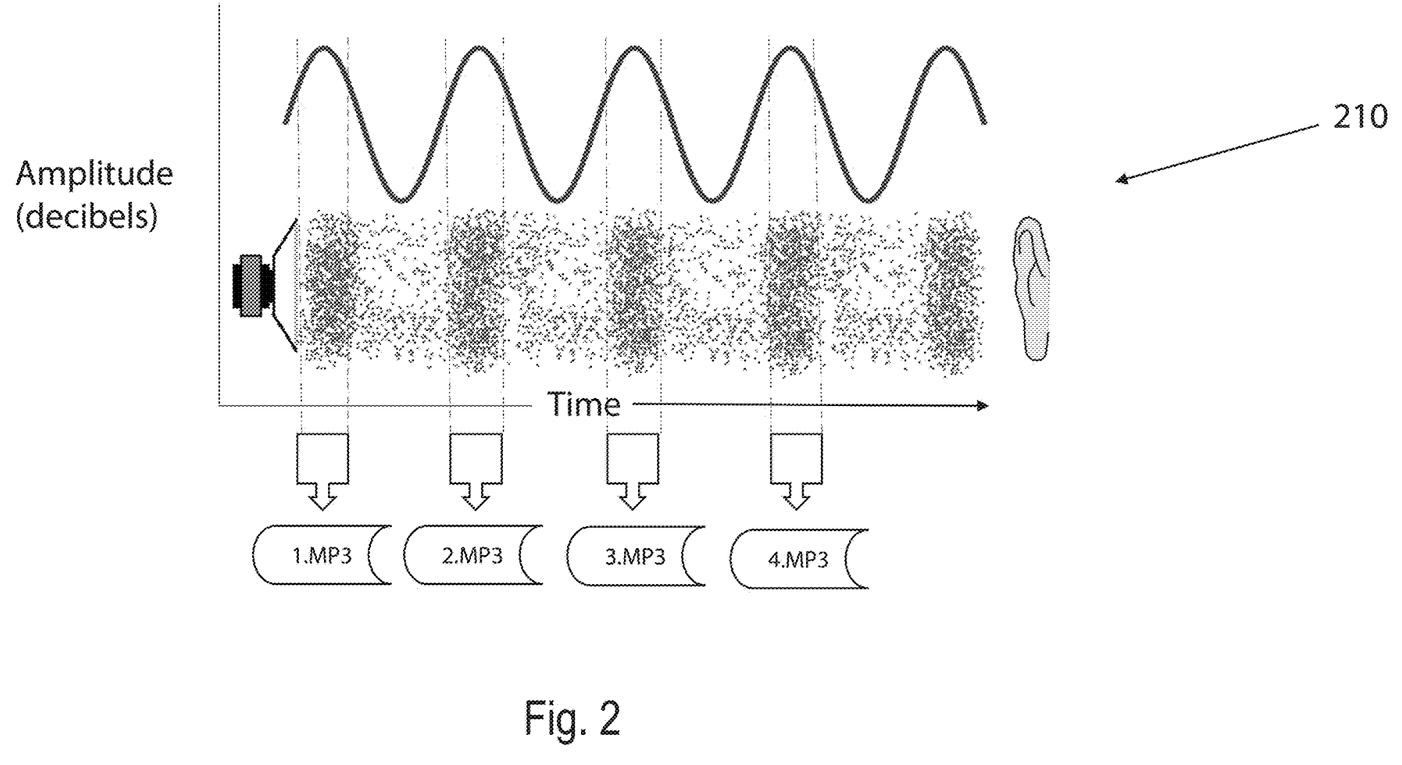
FIG. 2 shows an example representation of how an audio analytics module of the system of FIG. 1 may segment an audio track into audio segments.

FIG. 2 shows an example representation of how the audio analytics module 120 may segment the audio track into audio segments. FIG. 2 shows a basic representation of an audio waveform 210 that maps out the amplitude (in decibels) of the audio track over time. The audio analytics module 120 is configured to isolate spikes in the waveform 210 to identify when speech is taking place in the audio track. It then segregates out each speech spike and compartmentalises each spike into separate files. For example, a first audio segment of speech is recognised and compartmentalised into the file "1.MP3", a second audio segment of speech is recognised and compartmentalised into the file "2.MP3", etc.

Each of the audio segments is then passed to the identifier recognition module 130 for audio recognition checks.

Figure 3:
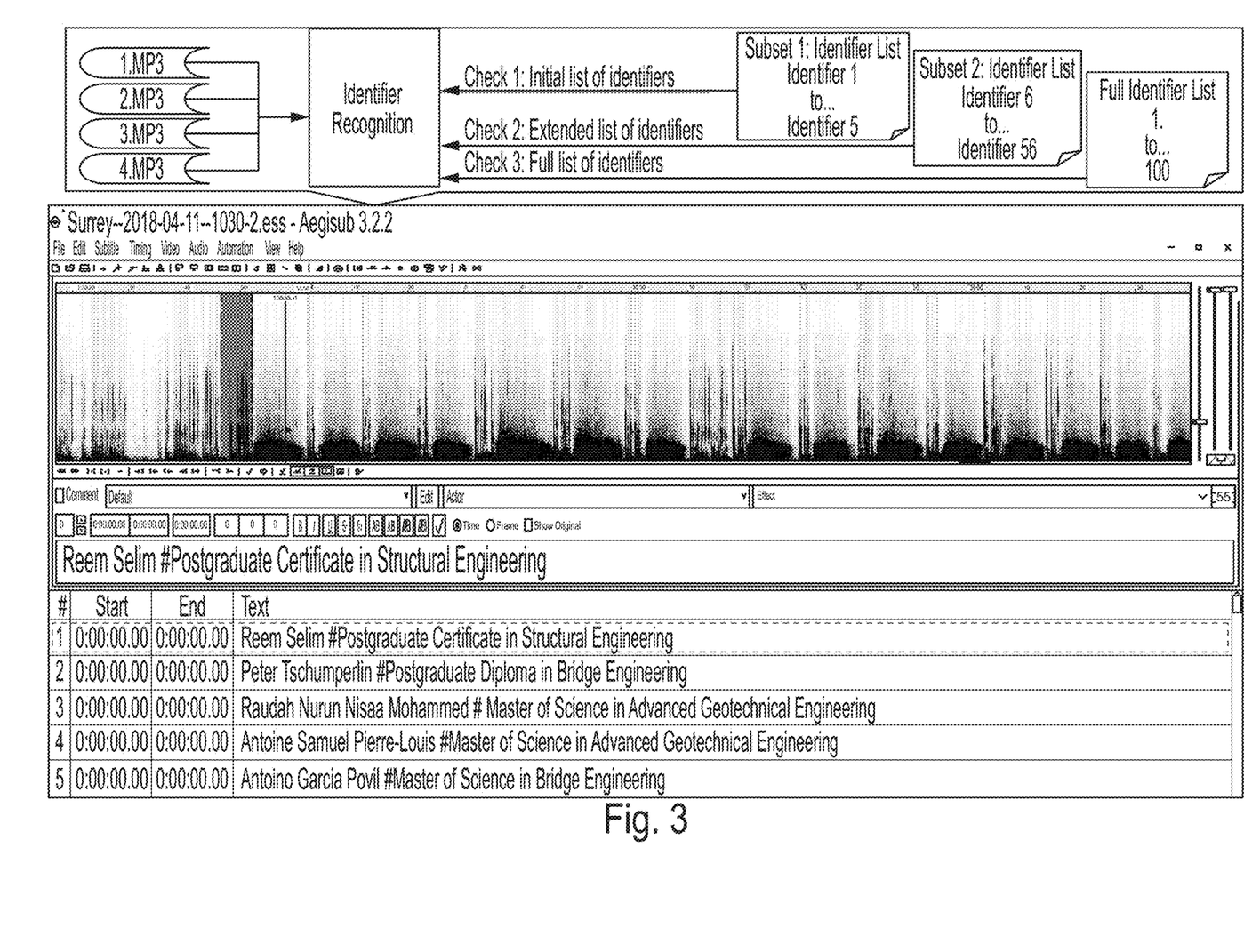
FIG. 3 shows an example representation of how an identifier recognition module of the system of FIG. 1 may perform audio recognition.

FIG. 3 shows an example representation of how the identifier recognition module 130 may perform audio recognition. First, each separate audio segment file and specific sets of vocabulary are run through audio recognition software with the objective of creating a match between the two. In this way, an audible identifier that is part of each audio segment may be recognised. Then, a subset of the full participant identifiers list (i.e., an initial list of participant identifiers) is loaded into the identifier recognition module 130 (for example, from any suitable data store within or outside of the system 110) so that the identifier recognition module 130 can learn the vocabulary of the initial participant list. It may then use the initial list of participants to match the audible identifier in the audio track to a participant identifier that is in the initial list of participant identifiers.

An example of participant identifiers are the names of people (participants) in a mass participation event (such as a graduation ceremony). In this example, the full list of participant identifiers is the ordered list of all people taking part in the mass participation event. The initial list is a smaller sub-set of this list, for example the next five people on the full list of participant identifiers.

If the identifier recognition module 130 matches the audible identifier recognised from the audio segment to a participant identifier in the initial identifier list, the audio segment is then assigned the matched participant identifier and that participant identifier is then discarded from future audio recognition. Thus, the audio segment is matched to a particular participant.

If the identifier recognition module 130 fails to match the audible identifier recognised from the audio segment to a participant identifier in the initial identifier list, an extended list of participant identifiers is loaded into the audio recognition module 130 so that it may learn this new set of vocabulary. The extended list of participant identifiers may comprise further participant identifiers taken from the full list of participant identifiers, but may still be a smaller list than the full list of participant identifiers.

If the identifier recognition module 130 matches the audible identifier recognised from the audio segment to a participant identifier in the extended identifier list, the audio segment is then assigned the matched participant identifier and that participant identifier is then discarded from future audio recognition.

If the identifier recognition module 130 fails to match the audible identifier recognised from the audio segment to a participant identifier in the extended identifier list, the full list of participant identifiers is loaded into the audio recognition module 130 so that it may learn this new set of vocabulary. A match is then found between the audible identifier and a participant identifier in the full list of participant identifiers.

By using audio recognition in this way, the system 100 may harness the fact that mass participation events usually involve an audio announcement of each participant at around the time that participant will appear in the source video (for example, during a graduation, a graduate's name is likely to be announced as they receive their degree, which is the time at which they are likely to appear in the source video). Thus, parts of the audio track, and by extension therefore the source media, may be reliably attributed to particular participants by using audio recognition and a list of the participants. This may provide more reliable, and faster, participant recognition than some other alternatives, such as facial recognition that is currently relatively slow and has a high error rate. Furthermore, a list of participants may be relatively easy to obtain and is generally very reliable—other participant information, such as facial recognition information, may not be so easily obtained.

By first using a short initial list of participant identifiers comprising a small number of participant identifiers (for example, the next five participants in an ordered, full list of participants), and then, if necessary, an extended list of participant identifiers and then, if necessary, the full list of participant identifiers, processing speeds may be improved since it may be expected that in most instances the participants will have taken part in the mass participation event in the expected order and the identifier recognition module 130 need therefore only to learn the small number of identifiers in the initial list. Only in the event of non-matching do longer lists of participant identifiers need to be learnt. However, in an alternative implementation, in the event of a non-match in the initial list of participants, the process may immediately go to the full list of participant identifiers. In a further alternative, rather than using initial and extended lists of participant identifiers, the process may use the full list of participant identifiers in the first instance (for example, if the order in which the participants take part in the event is not known in advance).

To finalize each matched audio segment, the identifier recognition module 130 may apply time rules to the start points of each audio segment, for example programming each the audio segment to begin x-n seconds (for example 0.5 seconds, or 1 second, etc) before the start point of the detected audio in the audio track and to end at, or just after, the start point of the next audio segment in the sequence. In this way, it is less likely that any relevant audio may be missed at the start of an audio segment.

Figure 4A:
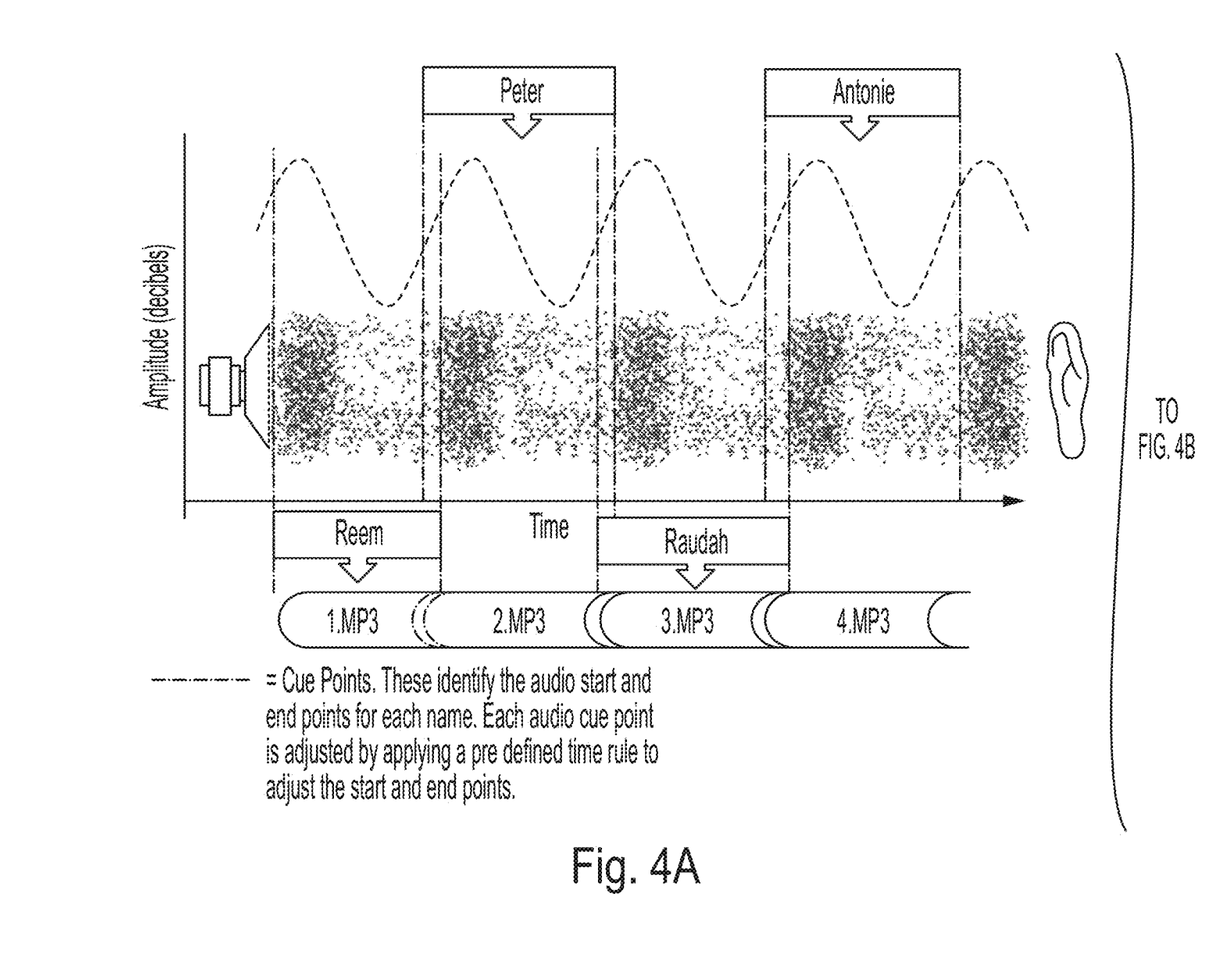
FIGS. 4A and 4B show a representation of each of the finalised audio segments created by the identifier recognition module of FIG. 3.
Figure 4B:
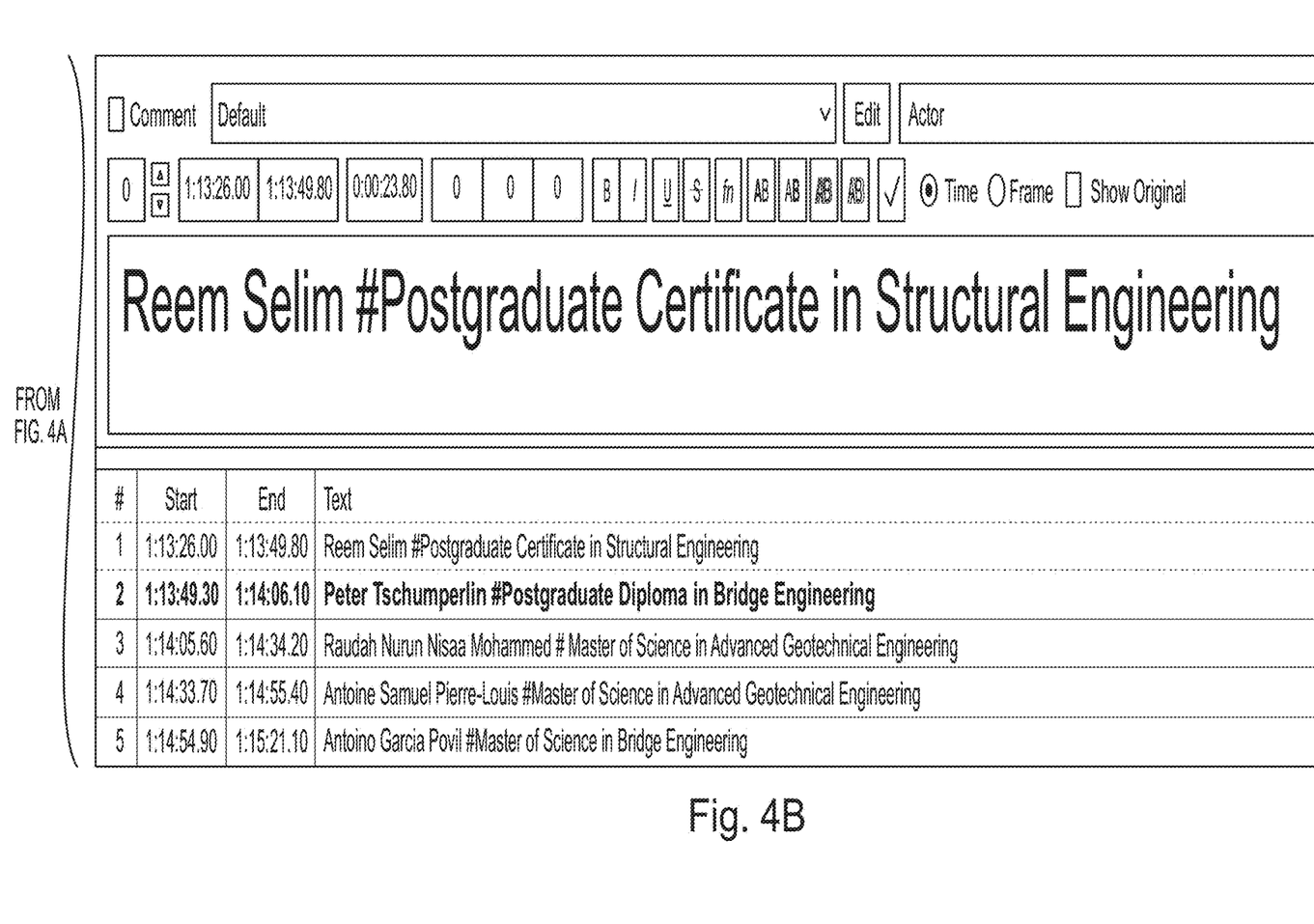

FIG. 4A shows a representation of each of the finalised audio segments, where the first segment "1.MP3" is matched to the participant identifier "Reem" and starts at 1:13:26.00 and ends at 1:13:49.80. The second segment "2.MP3" is matched to the participant identifier "Peter" and starts at 1:13:49.30 and ends at 1:14:06.10, etc. FIG. 4B shows additional information that may be displayed along with the representation of each of the finalized audio segments.

The outcome of this is that each audio segment extracted from the audio track may have a timecode indicative of the timing of the start of the audio segment (i.e., a cue point), a timecode indicative of the timing of the end of the audio segment (for example, it may be a timecode indicating the duration of the audio segment, or a timecode indicating the end time of the audio segment) and a participant identifier that has been matched to the audio segment.

Figure 5:
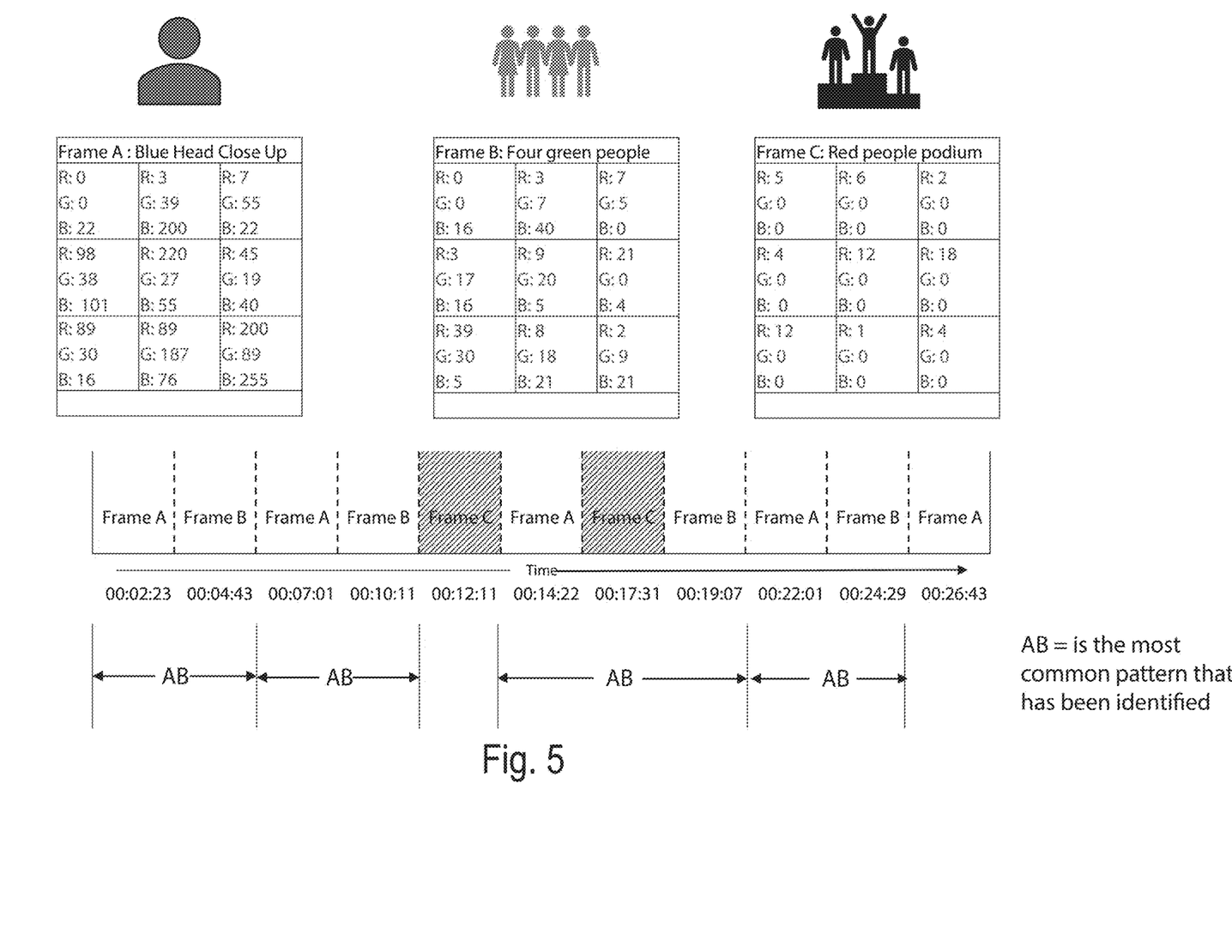
FIG. 5 shows an example representation of a scene analysis process that may be carried out by a video analytics module of the system of FIG. 1.

Returning to FIG. 1, the operation of the video analytics module 140 shall now be described with reference to FIG. 5.

The video analytics module 140 is configured to identify a plurality of video segments, each relating to a different participant in the mass participation event. FIG. 5 shows an example representation of a scene analysis process that may be carried out by the video analytics module 140 on the source video to identify the plurality of video segments. The source video is a sequence of image frames, each comprising a plurality of individual pixels The video analytics module 140 may then, for example, compare RGB values for corresponding pixels in sequential frames to determine a difference (for example, a difference between the red values for corresponding pixels in sequential frames, a difference between the green values for corresponding pixels in sequential frames and a difference between the blue values for corresponding pixels in sequential frames, or a difference between the total RGB value of corresponding pixels in sequential frames, etc). If the differences exceed a particular threshold level, this may indicate the scene in the source video has had a fundamental change. It can then save a time code in the video identifying the first frame in each scene, to end up with a list of timecodes indicating when a scene has changed. Using this method, a plurality of scenes in the source video can be identified. Whilst this is one particular example of how scene detection may be performed, it will be appreciated that any other suitable techniques may alternatively be used The frames at the listed timecodes (i.e., the first frame in each scene), or some arbitrary frame within each scene, may then be compared to each other, for example by comparing pixel patterns in the pixel RGB values in order to identify and group similar shots. In particular, each scene of a similar type may be categorised as a particular type of scene. For example, in FIG. 5, three different categories of scene are identified—"A: Blue Head Close Up", "B: Four green people" and "C: Red people podium". Each type of scene may have a similar pixel pattern, within particular threshold limits. Whilst this is one particular example of how scenes may be categorised, it will be appreciated that any other suitable techniques for categorisation of scenes may alternatively be used.

Frames that are similar or the same may be grouped together as a scene and categorised as a particular type of scene. Recurrences of the same types of scene may thus be identified using the categorizations and mapped into a series of timecodes with cue points (which are time codes). The video analytics module 140 may therefore detect a recurring pattern in the scene types across the plurality of scenes.

In particular, the categorisations of scenes enable the identification of sequences and patterns. For example, in FIG. 5 a sequence of shots that have been coded AB, AB, AB is clearly a pattern i.e. the same video-geographical shots. The video analytics module 140 may take the highest occurring pattern that has been identified as it is the common shot and, by definition, is therefore the relevant video clip required to match to the audio segments. At the same time, we may ignore the low volume patterns e.g. if the code CB only occurred once and is not part of any pattern, and discard those scenes so they do not appear in the final media clips.

Each instance of the recurring pattern may comprise one or more scenes (in the example of FIG. 5, it comprises two scenes, one of type A and one of type B), and each instance of the recurring pattern is a video segment of the source video. Thus, it can be seen that the repetitive nature of mass participation events can be utilised to divide the source video into a series of video segments, each relating to a different participant in the mass participation event.

Finally, the clip generator module 150 combines the relevant audio segments and video segments to create media clips, each media clip relating to a particular participant.

Figure 6:
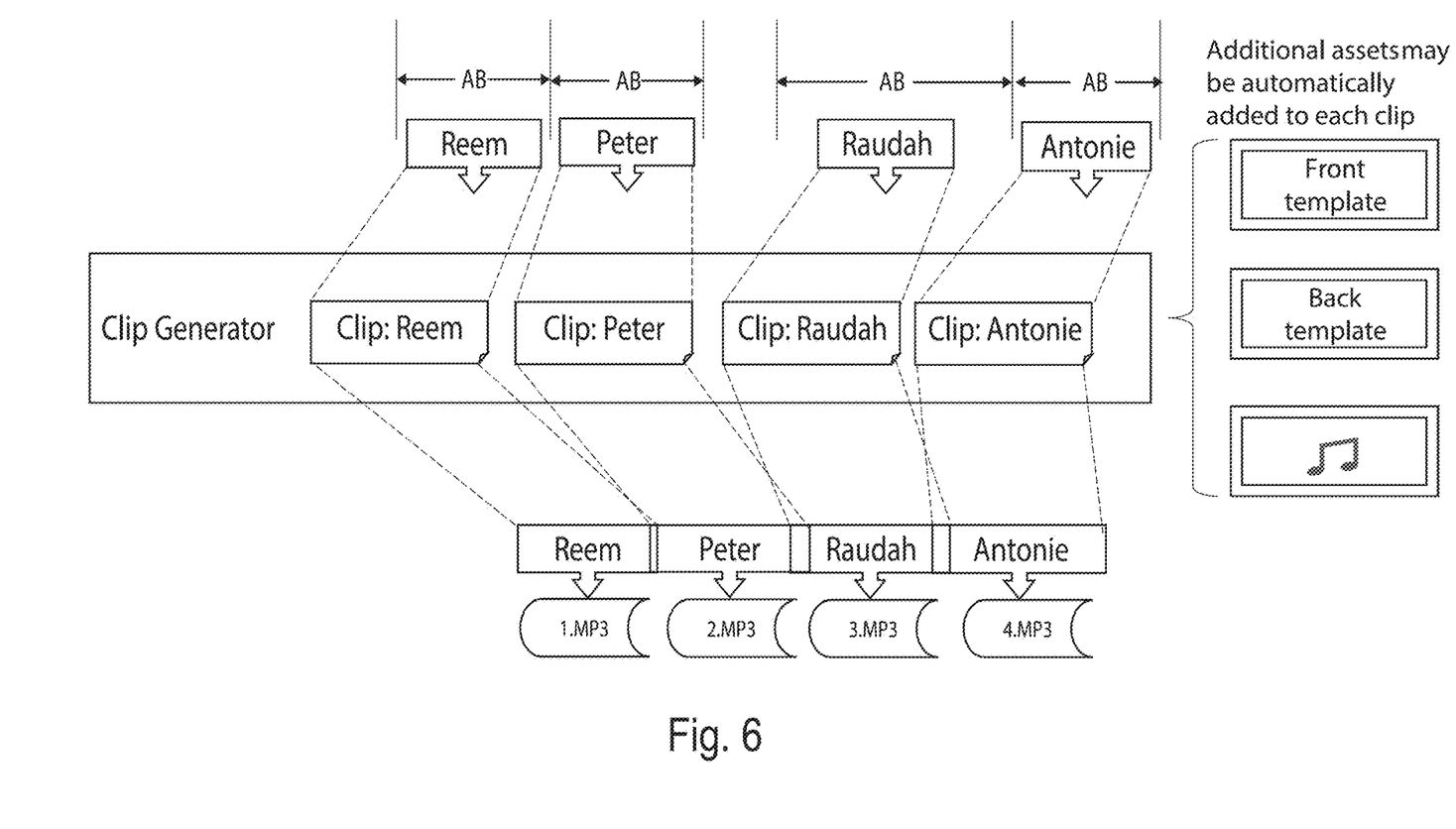
FIG. 6 shows an example representation of generating media clips based on audio segments and video segments.

FIG. 6 shows an example representation of generating media clips based on the audio segments and the video segments. In particular, we have the audio timecodes for each audio segment and the participant identifier matched to each audio segment. We also have the time sequenced visual cue points for the segmented video and with that we may combine the audio timecode with the first instance of the reoccurring video pattern, ensuring that the timecodes for both audio and visual are in sync. This produces the combined media clip with both the audio and video parts of the source media that relate to the particular participant that was matched to the audio segment. For example, the most closely matching video segment to an audio timecode for an audio segment may be found (for example, the audio timecode may be indicative of the start of the audio segment and the closest video timecode, indicative of the start of a video segment, may be found in order to match the audio segment to the video segment) and the media clip may comprise the matched audio segment and video segment. In the event that the start of the audio segment does not exactly align with the start of the matched video segment, the media clip may start from the earliest occurring segment (i.e., whichever of the audio or video segment starts at the earliest point in time), with the other segment being adjusted so that it is in sync. For example, if the audio segment starts at 1:15.4 and the matched video segment starts at 1:16.1, the media clip may start at 1:15.4 with the video segment being adjusted to start at 1:15.4 so that the audio and video are in sync. Likewise, the end of the media clip may also align with the last ending segment. Alternatively, the media clip may start and/or end with the start and/or end of the audio segment or the start and/or end of the video segment.

In an alternative, the audio segments may not be combined with the video segments to create the media clip. For example, each media clip may include a video segment but not also a corresponding audio segment—the audio timestamps and participant label for each audio segment may be used only to match each video segment to a particular participant.

Thus, for each participant, a media clip is created that is specific to them—i.e., it includes the part of the source media that relates to them, but does not include the other parts of the source media. The media clips are created automatically by the system 100 without requiring any slow, cumbersome human editing intervention, meaning the media clips can be created very quickly and in a highly scalable way.

Optionally, the clip generator module 150 may also transcode the media clip as necessary for output and/or add any one or more of the following to the media clip:

a) a front template video sequence preceding the video segment that has been matched to the particular participant (for example, a generic description of the event that is used for each different media clip, or a description that is unique to the particular participant in the media clip, for example giving individual details of the participant); and/or b) a back template video sequence following the video segment that has been matched to the particular participant (for example, a generic description of the event that is used for each different media clip, or a description that is unique to the particular participant in the media clip, for example giving individual details of the participant); and/or c) a graphics overlay on the video segment in the media clip; and/or d) an audio overlay.

The media clips may then be output to the clip distribution system 160 and/or clip storage 170 in any suitable format. For example, because of the speed and scalability of the system 100, it may be possible to stream each media clip in real-time, or near real-time, during the mass participation event, so that each media clip may be viewed by interested parties online during the event. Additionally or alternatively, the media clips may be stored in clip storage 170 for streaming or download by the participants after the mass participation event. For example, within minutes of completing the event, participants may download or stream their media clips.

The skilled person will readily appreciate that various alterations or modifications may be made to the above described aspects of the disclosure without departing from the scope of the disclosure.

For example, whilst the above describes audio recognition taking place first, then scene detection second, it will be appreciated that these processes may take place in the opposite order, or in parallel at the same time.

Furthermore, whilst a process of audio recognition may preferably be used in order to match each of the plurality of video segments to particular participants, in an alternative, and suitable matching process may be utilised. Furthermore, whilst a particular technique for scene detection and categorisation is described above using an analysis of RGB values in the image frames, in an alternative any suitable form of video processing scene detection may be used.

Whilst all of the interfaces represented by arrows in FIG. 1 show direct connections between each of the different entities and modules, it will be appreciated that there may be any number of intermediate entities or modules as part of those interfaces.

The aspects of the present disclosure described in all of the above may be implemented by software, hardware or a combination of software and hardware. The functionality of the system 100 may be implemented by software comprising computer readable code, which when executed on one or more processors of any electronic device, performs the functionality described above. The software may be stored on any suitable computer readable medium, for example a non-transitory computer-readable medium, such as read-only memory, random access memory, CD-ROMs, DVDs, Blue-rays, magnetic tape, hard disk drives, solid state drives and optical drives. The computer-readable medium may be distributed over network-coupled computer systems so that the computer readable instructions are stored and executed in a distributed way.

Whilst the above describes the system 100 as comprising a set of interconnected modules, each performing a particular function, it will be appreciated that all of the functionality of the system 100 may be implemented by a single logical entity, or by any arrangement of two or more logical entities, each of which may be co-located in the same physical device, or in different, interconnected physical devices, potentially each located in a different geographical location. Furthermore, the system 100 may be implemented as its own standalone entity, or may be implemented as a part of a larger entity (for example, as part of a larger server), or its functionality may be implemented by cloud computing.

The invention claimed is:

1. A computer implemented method of media processing comprising:
   receiving source media relating to a mass participation event, wherein the source media comprises a source video and an audio track of the mass participation event;
   identifying a plurality of video segments in the source video, wherein each different video segment relates to a different participant in the mass participation event;
   determining a matching video segment of the plurality of video segments corresponding to a particular participant of the mass participation event by:
      segmenting the audio track into a plurality of audio segments;
      performing audio recognition on at least a first audio segment of the audio track to recognise an audible identifier;
      comparing the audible identifier against a first list of participant identifiers; and
      if the audible identifier matches an identifier in the first list of participant identifiers, determining a first video segment in the plurality of video segments that corresponds to a position of the audible identifier in the audio track, wherein the matched identifier in the first list of participant identifiers corresponds to the particular participant and the identified video segment is the matching video segment corresponding to the particular participant; and
   outputting a media clip relating to the particular participant, wherein the media clip comprises the matching video segment corresponding to the particular participant.

2. The method of claim 1, wherein identifying the first video segment in the plurality of video segments that corresponds to the position of the audible identifier in the audio track is based at least in part on:

an audio timecode indicative of the start and/or end of the first audio segment; and
a video timecode indicative of a start and/or end of the determined first video segment.

3. The method of claim 1, wherein the first list of participant identifiers is an initial list of participant identifiers comprising identifiers for some, but not all, of the plurality of participants.

4. The method of claim 3, further comprising:
if the audible identifier does not match an identifier in the initial list of participant identifiers, comparing the audible identifier against a second list of participant identifiers; and
if the audible identifier matches an identifier in the second list of participant identifiers, determining a second video segment in the plurality of video segments that corresponds to a position of the audible identifier in the audio track, wherein the matched identifier in the second list of participant identifiers corresponds to the particular participant and the identified video segment is the matching video segment corresponding to the particular participant.

5. The method of claim 4, wherein the second list of participant identifiers comprises identifiers for all of the plurality of participants.

6. The method of claim 4, wherein the second list of participant identifiers is an extended list of participant identifiers comprising identifiers for some, but not all, of the plurality of participants, and wherein at least some of the identifiers in the extended list of participant identifiers do not appear in the initial list of participant identifiers.

7. The method of claim 6, further comprising:
if the audible identifier does not match an identifier in the extended list of participant identifiers, comparing the audible identifier against a third list of participant identifiers; and
if the audible identifier matches an identifier in the third list of participant identifiers, determining a third video segment in the plurality of video segments that corresponds to a position of the audible identifier in the audio track, wherein the matched identifier in the third list of participant identifiers corresponds to the particular participant and the identified video segment is the matching video segment corresponding to the particular participant.

8. The method of claim 7, wherein the third list of participant identifiers comprises identifiers for all of the plurality of participants.

9. The method of claim 1, wherein:
the audible identifier is an audible name; and
the participant identifiers are participant names.

10. A media processing system comprising:
one or more processors; and
memory storing instructions that, when executed by the one or more processors, cause the media processing system to:
receive source media relating to a mass participation event, wherein the source media comprises a source video of the mass participation event;
identify a plurality of video segments in the source video, wherein each different video segment relates to a different participant in the mass participation event;
determine a matching video segment of the plurality of video segments corresponding to a particular participant of the mass participation event, wherein the instructions cause the media processing system to
determine the matching segment by causing the media processing system to:
segment the audio track into a plurality of audio segments;
perform audio recognition on at least a first audio segment of the audio track to recognise an audible identifier;
compare the audible identifier against a first list of participant identifiers; and
if the audible identifier matches an identifier in the first list of participant identifiers, determine a first video segment in the plurality of video segments that corresponds to a position of the audible identifier in the audio track, wherein the matched identifier in the first list of participant identifiers corresponds to the particular participant and the identified video segment is the matching video segment corresponding to the particular participant; and
output a media clip relating to the particular participant, wherein the media clip comprises the matching video segment corresponding to the particular participant.

11. The media processing system of claim 10, wherein the source video comprises a plurality of image frames, and wherein the instructions cause the media processing system to analyse the source video to identify the plurality of video segments by causing the media processing system to:
analyse the plurality of image frames to identify a plurality of scenes in the source video; and
categorise each scene as a particular scene types.

12. The media processing system of claim 11, wherein the instructions further cause the media processing system to:
detect a recurring pattern in the scene types across the plurality of scenes, wherein each instance of the recurring pattern comprises one or more scenes, and wherein the image frames in each instance of the recurring pattern make up a respective video segment of the plurality of video segments.

13. The media processing system of claim 12, wherein the instructions further cause the media processing system to:
discard at least one scene that does not fit the recurring pattern such that the discarded at least one scene does not appear in any of the plurality of segments.

14. The media processing system of claim 11, wherein:
each of the plurality of image frames comprises a plurality of pixels, and
analysing the plurality of image frames to identify the plurality of scenes in the source video is based at least in part on colour values of the plurality of pixels in the plurality of image frames.

15. One or more non-transitory computer readable media storing instructions that, when executed by one or more processors, cause a media processing system to perform steps comprising:
receiving source media relating to a mass participation event, wherein the source media comprises a source video of the mass participation event;
identifying a plurality of video segments in the source video, wherein each different video segment relates to a different participant in the mass participation event;
determining a matching video segment of the plurality of video segments corresponding to a particular participant of the mass participation event by:
segmenting the audio track into a plurality of audio segments;

performing audio recognition on at least a first audio segment of the audio track to recognise an audible identifier;

comparing the audible identifier against a first list of participant identifiers; and if the audible identifier matches an identifier in the first list of participant identifiers, determining a first video segment in the plurality of video segments that corresponds to a position of the audible identifier in the audio track, wherein the matched identifier in the first list of participant identifiers corresponds to the particular participant and the identified video segment is the matching video segment corresponding to the particular participant; and outputting a media clip relating to the particular participant, wherein the media clip comprises the matching video segment corresponding to the particular participant.

16. The non-transitory computer readable media of claim 15, wherein the media clip further comprises at least one of:

a front template video sequence preceding the matching video segment corresponding to the particular participant;

a back template video sequence following the matching video segment corresponding to the particular participant;

a graphics overlay on the matching video segment corresponding to the particular participant; or a portion of an audio track corresponding to the matching video segment corresponding to the particular participant.

17. The non-transitory computer readable media of claim 15, wherein the source media is:

a live media feed of the mass participation event, or
recorded media of the mass participation event.

* * * * *